United States Patent [19]
Heyn et al.

[11] 3,790,180
[45] Feb. 5, 1974

[54] FLUID SEAL WITH PUMPING ACTION

[75] Inventors: William O. Heyn; Glenn W. Peisker, both of Barrington, Ill.

[73] Assignee: Chicago Rawhide Manufacturing Company, Chicago, Ill.

[22] Filed: May 28, 1971

[21] Appl. No.: 147,949

[52] U.S. Cl. ............................................. 277/134
[51] Int. Cl. .......................... F16j 15/54, F16j 9/00
[58] Field of Search .................................. 277/134

[56] References Cited
UNITED STATES PATENTS

| | | | |
|---|---|---|---|
| 3,497,225 | 2/1970 | Workman | 277/134 |
| 3,534,969 | 10/1970 | Weinand | 277/134 X |

FOREIGN PATENTS OR APPLICATIONS

| | | | |
|---|---|---|---|
| 1,600,458 | 8/1970 | Germany | 277/134 |
| 306,207 | 11/1968 | Sweden | 277/134 |

*Primary Examiner*—Samuel B. Rothberg

[57] ABSTRACT

An oil or like fluid seal acting upon rotation of an associated element to pump oil lying on the associated element into the region being sealed. The described forms of seals include a primary lip and a plurality of individual, wedge-like pumping elements, with the elements having the working surfaces thereof lying substantially parallel to the associated element so as to overlie the element along a substantial portion thereof. The actual working surface comprises only a portion of the entire surface of the pumping element which is directed toward the associated element, with contact being formed along a large area of generally truncated eliptical pattern. The pumping element is formed so that the face thereof is flat, or of substantially different radius than the associated element, causing gradual radial convergence between a given portion of the associated element and the working face of the element as relative rotation occurs. In the preferred form, several of the pumping elements are radially spaced relative to one another and thereby adapted for successive operative engagement with the shaft or other element only after at least portions of the other elements have been worn in use. Accordingly, a succession of elements is inherently brought into working engagement with the movable element to provide continued pumping action throughout an extended life of the seal unit. The seals are made by a simple process using a mold core which is in turn manufactured by a simple method.

6 Claims, 14 Drawing Figures

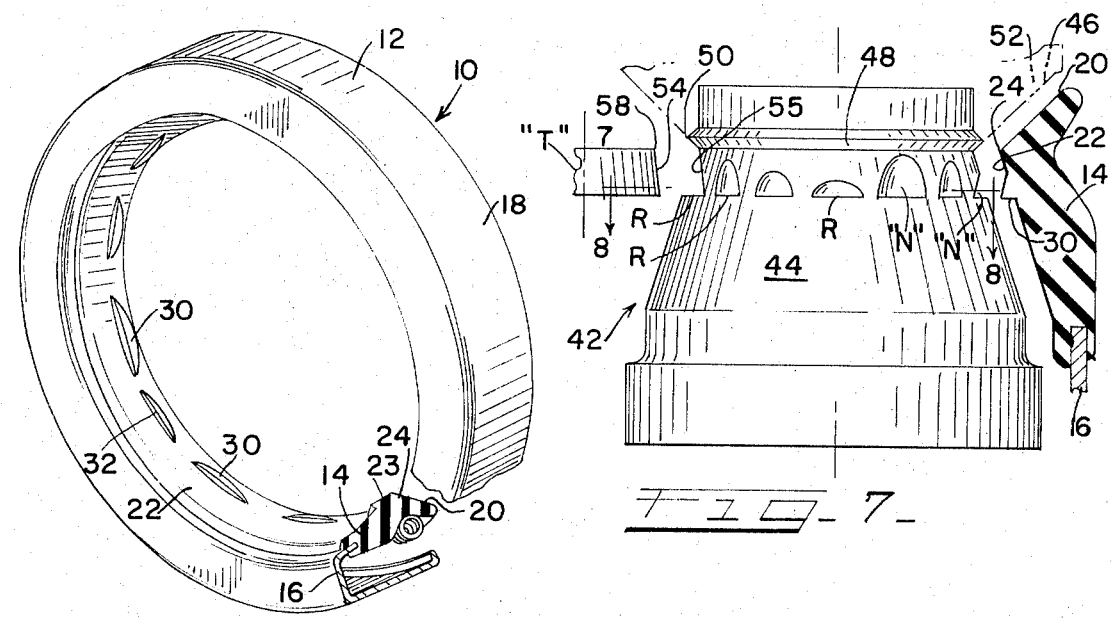
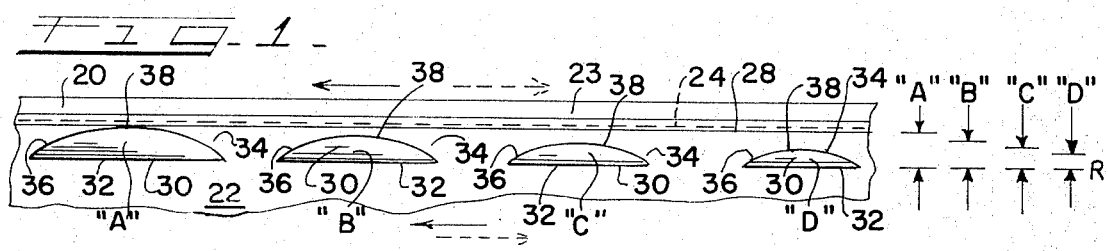
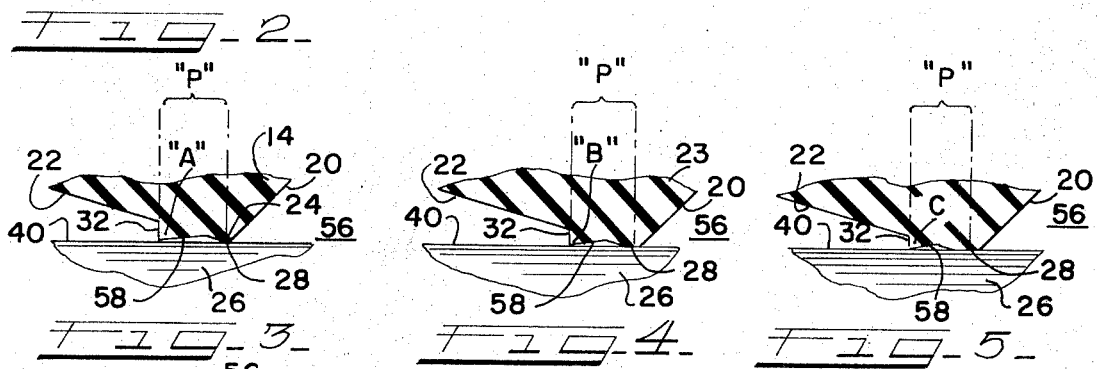
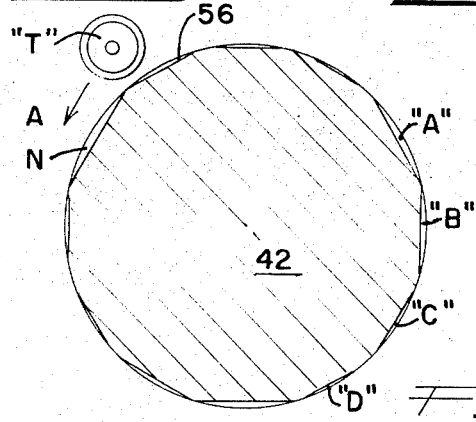
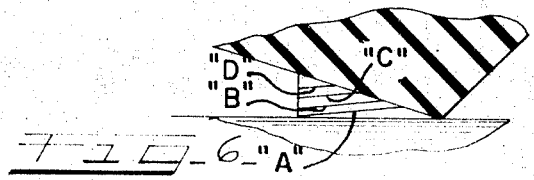
INVENTORS
WILLIAM O. HEYN
GLENN W. PEISKER
BY
ATT'YS

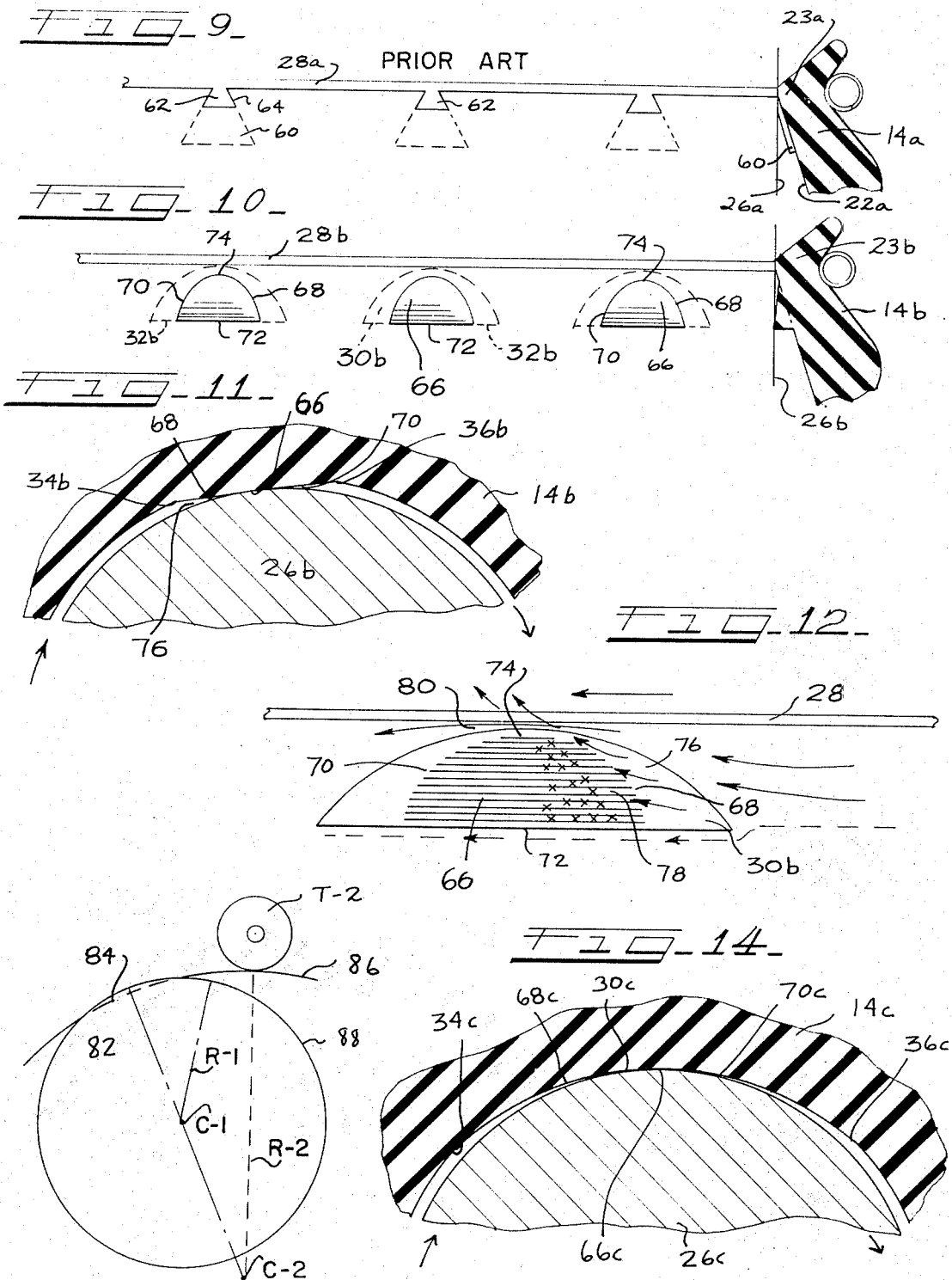

FLUID SEAL WITH PUMPING ACTION

BACKGROUND OF THE INVENTION

The present invention relates to fluid seals, and, more particularly, to shaft seals or like radially acting seals intended to have a hydrodynamic or pumping action which serves to pump back into the sealed region any oil tending to pass therefrom under the primary or wet lip and axially outwardly along an associated shaft or other surface being sealed. Seals of this type are already generally known and some designs thereof have achieved a certain degree of commercial success. However, as in the case of a number of products which are in a state of relative commercial infancy, there is substantial room for additional development and improvement, particularly in the areas of extended seal life, consistent performance and ease of manufacture.

Thus, oil seals having a pumping action are known to be desired for certain applications, particularly those wherein fluid loss is more likely to occur at high speeds, than at low speeds or in a static condition of the movable parts. Seals of this general type are often referred to as hydrodynamic seals from the pumping action which occurs in the presence of dynamic forces rather than static forces, usually by reason of relative movement of a physical body through a viscous fluid adsorbed on another physical body.

Although it may be superficially supposed that oil seals, to be effective, ride in a very tight fitting relation to an associated shaft, this is not actually true in a literal sense, since oils and greases, particularly those commonly used in large scale applications such as automobiles, include wetting agents and other surface active materials which create very tenacious adherence between the fluid and the shaft to be sealed. Consequently, a seal rides over this film of fluid rather than literally on the shaft. To a greater or less extent, one or more layers of fluid may also be relatively strongly attracted to the sealing band portion of the seal, that is, the portion of the sealing lip which contacts the oiled surface of the shaft.

Therefore, oil leakage between the seal and the shaft is not always prevented so much by close physical contact of the seal and the shaft as by the surface effect of the layers of fluid lying between the two relatively movable elements. Thus, in practice, under a given static pressure, which is ordinarily only that of the head of liquid in the confined space, a condition of equilibrium is rapidly reached wherein a bead or meniscus is formed between parts of the seal and parts of the shaft. This meniscus occupies a significant volume in the sense under consideration, that is, it represents a measurable quantity of oil, which, while not per se creating a leakage problem, is a volume disposed on the dry side of the primary sealing unit, which may at least partially be returned to the wet side thereof. The volume of this oil may vary considerably in practice, and it often becomes troublesome under conditions of high speed shaft rotation. Thus, hydrodynamic seals are often called upon to return this volume in excess of a normal meniscus volume to the sealed region.

While returning this oil to the interior of the sealed area may be accomplished in different ways, it is apparent that, in a typical application, such as an automotive application, peripheral speeds of the shaft may vary considerably and therefore, a satisfactory seal is not necessarily the one having the greatest pumping rate, since such a seal might literally pump itself dry during use over extended periods at high speeds. However, such a seal should have sufficient pumping capacity to be effective at low speeds and to permit the use of a seal which is radially sized carefully in relation to the shaft size or which is urged into engagement of the shaft by a garter spring which need exert only a reasonable force.

Another consideration which is present in seal design is the matter of continued performance after a certain time has elapsed, or after a seal has been worn significantly but is still operative. Other matters which must be considered in seal design include the provision of relatively positive static seal without sacrifice of pumping characteristics.

Thus, a number of prior art seals have been characterized by good pumping action but unsatisfactory static seal performance, usually by reason of the protrusion of the dynamic or pumping elements into the static lip area. Other seals have shown sufficient pumping capacity when new, but diminished or insufficient pumping capacity after extended use. The present invention is directed to providing improved hydrodynamic or pumping action oil seals which are an improvement over prior known seals of the same general type, but which lack certain of the drawbacks or disadvantages thereof, and which includes a number of novel features and advantages.

Accordingly, it is an object of the invention to provide an improved oil seal with a pumping action.

A further object is to provide an oil seal having effective pumping action over an extended service life.

A still further object is the provision of an oil seal having good static sealing performance without sacrifice of pumping capacity.

Another object is to provide an oil seal with a pumping action which contains working elements or working surfaces of a significantly different construction than prior art elements intended to have the same or similar effect.

Another object is the provision of a pumping oil seal which operates on a principle which is substantially different from the operational principle of known prior art oil seals.

A still further object is to provide an oil seal of a novel type having plural pumping elements of generally wedge-like form, with several such elements being disposed in different relation to the primary lip or seal band area.

A further object is the provision of an oil seal having a working surface thereof forming a novel contact pattern on an associated shaft or other element.

A further object is to provide oil seals having plural pumping elements of different depth but lying on a common base or reference line.

A still further object is to provide an oil seal which is easy to manufacture under conditions of accurate quality control.

Another object is to provide a method and apparatus for manufacturing a novel oil seal of the type referred to above.

Another object is to provide an oil seal having one or more of the foregoing advantages and characteristics and further characterized by the inclusion of pumping elements having a substantial axial extent, with certain portions of these pumping elements being adapted to contact an associated shaft along a predetermined portion of the pumping element, with the contacting portion of the element being partially but not entirely coextensive with the entire pumping element.

A further object is to provide an oil seal as set forth above and particularly characterized by the provision of plural elements having working surfaces thereof disposed at different radial distances, whereby such elements will successively engage an associated shaft or other element only after wear of at least some of the other elements.

A further object is to provide an oil seal having a primary lip and a plurality of individual wedge-like pumping elements, with several of the elements being radially spaced relative to one another and thereby adapted for successive operative engagement with an associated shaft or other relatively movable element only after a certain amount of wear has taken place with respect to certain of the other of the elements, whereby, as the elements lying closer to the movable element wear and become less effective to pump oil, other of the elements will inherently be brought into cooperative working engagement with the movable element in order to provide continued pumping action throughout an extended life of the seal unit.

A further object is to provide a seal unit having means associated therewith for engaging a film of oil associated with the shaft or the like and for utilizing hydrodynamic lifting forces generated during rotation of the element to force the oil beneath a slightly raised seal primary lip and into the region to be sealed.

These and other objects and advantages are primarily accomplished by providing a novel sealing unit having a primary or shaft engaging lip and at least one pumping element having an inner surface extending axially a substantial distance away from the seal band formed by contact between the associated shaft or the like and the seal primary lip and adapted to engage a surface of the shaft with a predetermined contact pattern, and are also accomplished by providing a novel sealing unit having a primary or shaft-engaging lip, and a plurality of pumping elements, with several of the pumping elements being radially spaced relative to one another and thereby adapted for successive operative engagement between working surface portions thereof and an associated relatively rotatable member after wear of the primary lip and certain of the elements, with the earliest operative elements having a given effective diameter closest to that of the primary lip and other of the elements adapted for later operation having working surfaces of successively enlarged or reduced diameters, depending upon the radial direction in which the primary sealing lip is directed.

The manner in which these objects and advantages are achieved will become more clearly apparent when reference is made to the accompanying detailed description of preferred embodiments of the invention set forth by way of illustration, and when reference is made to the accompanying drawings in which like reference numerals indicate corresponding parts throughout.

BRIEF DESCRIPTION OF THE DRAWINGS

FIG. 1 is a perspective view, with portions broken away, of a radially acting shaft seal embodying the present invention;

FIG. 2 is a developed view of a portion of an inwardly facing surface of the seal unit of FIG. 1;

FIG. 3 is a vertical sectional view of an enlarged scale, showing the shaft contact pattern of the seal of the invention, taken before substantial wear of the seal has occurred;

FIG. 4 is a view through another section of the seal of FIG. 1, with the seal shown after further wear thereof;

FIG. 5 is a view through another section of the seal of FIG. 1, shown after still further wear of the seal unit;

FIG. 6 is a developed view, partly in elevation and partly in section, showing the radial spacing of the working surfaces of the pumping elements;

FIG. 7 is an elevational view of a mold core used in the manufacture of seals according to the invention, and showing one method of manufacturing the core used to make such seals;

FIG. 8 is a horizontal sectional view, taken along lines 7—7 of FIG. 6, showing the varying depths to which cuts are made in the mold core used to manufacture seals according to the invention;

FIG. 9 is a developed view of a contact pattern formed on a shaft by a typical prior art seal of the type illustrated in section therein;

FIG. 10 is a developed view of the contact pattern formed on a shaft by one form of pumping element of the seal unit of the invention;

FIG. 11 is an enlarged vertical sectional view, exaggerated for purposes of illustration and showing the contact between one portion of a seal of the invention and an associated rotary shaft, and taken along lines 11—11 of FIG. 3;

FIG. 12 is an enlarged view, partly diagrammatic, schematically showing certain of the forces believed to be operative to account for certain performance features of the seal of the invention;

FIG. 13 is a diagrammatic view of a core unit used to form a modified form of seal according to the invention; and FIG. 14 is a fragmentary end view, in vertical section, showing a modified form of seal and the relation thereof to an associated shaft.

DESCRIPTION OF THE PREFERRED EMBODIMENTS OF THE INVENTION

Before referring to the drawings in detail, it will be understood that, although the invention is capable of application to different forms and varieties of seal units, including radially inwardly and radially outwardly acting units, for example, by reference to a shaft seal having an elastomeric seal body bonded to a metal seal mounting portion, with the seal body including a single primary lip adapted to surround and exert an inward radial sealing force on a shaft passing therethrough and containing one or more pumping elements adapted to engage the shaft with working surface portions thereof to force fluid from the exterior or dry side of the primary lip beneath the so-called seal band and into the interior or sealed region lying on the wet side of the primary lip. As used herein, the term "seal band" is used to describe an annularly extending region of primary sealing engagement between a portion of the primary lip and the shaft, although it will be understood that, properly speaking, this region may not be one of literal contact but may include a thin layer of fluid between the shaft and the seal.

Referring now to FIG. 1, which illustrates an embodiment of the invention combining several features thereof, there is shown a fluid seal assembly 10, which includes a metal or like rigid mounting element 12 and an elastomeric sealing body 14 attached, as by bonding, to a flange 16 of the mounting element 12. Typically, the mounting element 12 includes an annularly extending, radially outwardly facing mounting surface 18 adapted for snug reception within an associated opening such as a bore or counterbore in a machine housing or the like. The seal body 14 includes a radially inwardly facing, inclined, annularly extending interior surface 20, an oppositely inclined, annularly extending, radially inwardly facing exterior surface 22, and a primary sealing lip 23 lying therebetween, with the lip 23 having an edge 24 formed at the junction of the interior and exterior surfaces 20 and 22, it being understood that the interior surface is so named since it is disposed in generally inwardly facing relation to the region to be sealed, and that the exterior surface 22 named since it faces the exterior or so-called dry end of the shaft 26 or other member to be sealed.

By reference to FIG. 2, it will be noted that, in actual use, as viewed from the surface of an associated shaft, a seal band 28 of finite width is present where the edge 24 of the primary lip 23 flares out slightly upon contact with the shaft 26. This band 28 extends to either side of the edge 24 and is referred to as the primary seal band, since it serves as the primary barrier against passage of fluid from the interior of a region 56 to be sealed to the outside of such region. As referred to above, and as will be detailed further herein, however, a part of the "dry" side 22 of the seal 10 is actually wet by an oil film, as is a certain axial extent of the shaft 26, the two films being joined to each other along an annular, curved path or meniscus, as is well known in the fluid sealing art.

Referring again to FIGS. 1 and 2, there are shown a plurality of pumping elements 30 several of the elements being of different size and radial disposition than their otherwise similar counterparts. The largest elements are designated "A", the next largest "B" and so on. In the preferred embodiment shown, each of the elements 30 is in the shape of a rounded triangle having a generally radially directed rear surface portion 32, a leading edge 34 and a trailing edge 36. Between these edges 34, 36, is an area of inflection or a nose portion 38 which, in the case of some elements 30, lies immediately or almost immediately adjacent the seal band 28, and, in other cases, is more or less closely spaced axially apart therefrom.

As will appear hereinafter, the expressions "leading edge 34" and "trailing edge 36" are applied to the form of seals shown in FIG. 2 to indicate the leading and trailing edges of the elements 30 themselves and not necessarily to the leading edge portions of the parts of these elements which will engage the associated shaft in use. A further explanation thereof will be made in connection with a description of FIGS. 10–12.

In the illustrated form of seal, each element 30 has the rear surface portions 32 thereof disposed in coplanar relation with the rear surfaces of the other elements with the result that, as illustrated in FIG. 2, for example, the total axial extent of elements "A" is greater than that of elements "B", and so on for elements "C" and "D", etc., it being noted that the reference or base line "R" lies in a single plane coplanar with surfaces 32. In the form illustrated, three each of elements 30 corresponding in size to element "A" are provided in a single seal, as are three each elements 30 of sizes "B", "C", and "D".

Referring now to FIG. 6, and bearing in mind that surface 22 is frusto-conical in shape, it is a concomitant of the reduced axial extent of the elements "B" in regard to elements "A" and the coplanar disposition of surfaces 32 that the "B" elements are also of reduced radial extent in relation to the "A" elements. In a radially inwardly acting seal, therefore, the "B" elements lie on a locus of increased diameter, with respect to the "A" elements, while the "C" elements lie on a path of increased diameter with respect to the "B" elements and so on. Thus, as shown in FIG. 6, which is somewhat exaggerated for purposes of illustration, there are in the illustrated embodiment four different effective diameter sets of sealing elements 30.

Inasmuch as each element 30 is a solid figure lying on the interior of a frusto-conical surface, since the seal body 14 is elastomeric, and since the seal body is somewhat deflected when placed over a shaft in position of use, the exact form of each element 30 may vary from its originally formed shape, and the contact pattern made thereby on a portion of an associated shaft will not necessarily be in an accurately predictable geometric shape; however, the form is preferably that of an ellipse truncated or cut off at the end opposite the end closest the seal band. Accordingly, for purposes of the invention, it is only important that contact on the shaft or other member be made by what is referred to as a working surface of the elements 30, and that the leading edges of these elements are rounded or inclined with respect to the movement direction of the shaft or other relatively rotatable member. Accordingly, the expression "working surface" is intended to include the portions of the elements 30 which contact or act upon the shaft as well as those surfaces which contact or act upon the oil film to force the oil between the body 14 and the shaft 26. Further reference will be made elsewhere herein to the configuration of these surfaces and the operation thereof, particularly in reference to FIGS. 10–12.

Bearing in mind that the function of the working surfaces of these elements 30 is to act as means to force the oil under dynamic conditions beneath the seal band 28 into the interior 56 of the region sealed by the assembly 10, it will be appreciated that upon rotation of an associated shaft 26 in a direction illustrated by the arrows in FIG. 2, a working surface of an "A" pumping element 30 will engage oil lying on the radially outer surface 40 of the shaft 26, wedging or forcing it beneath the seal band 28. This action is very pronounced during high speed shaft rotation, since the oil adsorbed on or clinging to the shaft tends to rotate therewith, drawing closely adjacent layers along with it. However, the layers lying more distant from the surface 40 of the shaft 26 encounter portions of the stationary pumping elements 30, and the momemtum of the oil, coupled with its strong internal cohesion, serves to increase the pressure beneath the elements to raise them ever so slightly or to reduce the radial inward pressure thereon and thereby pump substantially all but the surface layers thereof beneath the seal band 28.

In use, after a certain amount of wear takes place, the profile of the portions of the "A" elements 30 actually contacting the shaft 26 changes to a relatively steeply inclined angle, and the seal band 28 increased in width until its axially outer edge, for example, lies along dimension line "B" of FIG. 2. Since the "A" elements have theretofore become or are then becoming less effective, it is necessary that the "B" elements 30 become effective for pumping oil. This wear sequence is illustrated in FIGS. 3 and 4, where it is shown that the working surfaces of the "A" and "B" elements respectively are successively contacting the shaft as the width of the seal band 28 increased. In FIG. 5, working surfaces of an element "C" is shown to have come into effective contact with the shaft 26, and the seal band 28 has become widened further. FIGS. 3–5 also illustrate that a reference distance "P" between the edge 24 forming the center of the original seal band 28 and the rear surface 32 of each element 30 remains the same, although the seal band 28 has widened considerably and although the working surfaces of the "C" elements 30 have significantly greater effective diameters than those of the "A" elements 30, for example.

Accordingly, regardless of any tolerable amount of wear of the primary lip 23, a predetermined number of pumping elements remains effective to provide pumping action. In this way, the seal element does not produce a high pumping rate when new and a reduced pumping rate when old. Since the present invention concerns elements which normally produce relatively strong pumping action, only a few such elements are usually necessary, depending upon shaft and seal sizes, rate of shaft revolution, etc. However, in common seal diameter sizes, providing one to four of each type of element has proven to be satisfactory, and accordingly, several elements of each effective radial dimension are provided in a single seal unit so that significant wear may be tolerated therein without significant alteration of the pumping rate.

Referring again to FIG. 2, it will be noted that the trailing edges 36 of each element 30 are mirror images of the leading edges 34, and that the contact patterns of certain portions of the elements 30 are also mirror images of their counterparts. Accordingly, the seal is equally effective if relative shaft rotation occurs in an opposite direction, that is, in a direction shown by the dotted line arrows in FIG. 2. For this reason, the seal of the invention is referred to as a "birotational" or "bidirectional" seal, such terms being intended to mean that the same seal will pump oil in the same axial direction regardless of the direction of shaft rotation, as distinguished from referring to the type of seal wherein, for example, opposite hand helixes are provided so that rotation in one direction will serve to pump two different fluids into opposite axial directions. Since, as is also illustrated in FIGS. 2–5, the elements 30 do not actually extend into the seal band 28 and, therefore do not act to raise any portion of the seal body 14 from the shaft 26, a good static seal is provided. In other words, seals of this type are capable of providing fluid-tight sealing without dependance upon rotation, although relative rotation serves to retain fluid within the sealed region which might tend to escape upon rotation.

Referring now to FIGS. 7 and 8, a preferred method of making seals according to the invention is illustrated. Referring specifically to FIG. 7, a mold core generally designated 42 is shown to include a so-called barrel cone portion 44 which is frusto-conical in shape and which is joined along an annular line 46 to a second, annularly extending, frusto-conical surface 48 which in turn terminates along an annular mold parting line 50. Since the core 42 is commonly a removable insert, the line 50 lies radially only slightly outwardly of the line 46, it being understood that one or more other mold elements schematically represented at 52 will normally mate with the core 42 to define the generally annular cavity in which the seal is formed. As is well known to those skilled in the art of manufacturing fluid seals, the core 42 forms one part of multipart molds used for compression or transfer molding of seals by a process which includes simultaneously forming the seal body and bonding it to an associated mounting element such as the element 12. In FIG. 7, such a seal is fragmentarily shown in a spaced apart or exploded relation so that the positions of the seal body 14, and its mounting flange 16 may be seen in relation to the mold. FIG. 7 also illustrates that a plurality of notches "N" in the barrel cone 44 form the pumping elements 30 in the seal body 14 and that, in molded lip designs, the line 46 forms the edge 24 of the primary lip 23. FIG. 7 also shows that the surface of the barrel cone 44 forms the contour of the exterior surface 22 of the seal body 14 and that the interior surface 20 of the seal body 14 is formed, at least in part, by the frusto-conical surface 48. It may be noted that the notches "N" are of varying depth but that the end portions most remote from line 46 lie on a common line or in common plane of reference R. Each notch "N" is preferably cut by a rotary tool "T" which is shown to have a very slightly inclined cutting edge 54. Accordingly, the flat surface 55 of each notch is not exactly parallel to the axis of the associated shaft. Thus, the surfaces 58 (FIGS. 3–5) of each sealing element 30 do not lie parallel to the shaft. Although it will be understood that, upon installation of the seal unit 10, the contours of the seal body 14 undergo significant change and the dimensions of the seal as formed are therefore not always necessarily coincident with their size and shape as installed, the formation of the pumping elements 30 in this manner provides a truncated elliptical contact pattern on an associated shaft. Accordingly, the exact manner in which the notches "N" are cut in the barrel cone 44 may be varied somewhat according to the preference of those skilled in the art, and the exact shape of contact pattern desired.

While FIG. 7 shows the cutting tool "T" in an exploded or radially spaced relation from the core element 42, FIG. 8 shows that the notches "N" may be formed by moving the rotating cutting tool "T" along a line parallel to and spaced just radially inwardly from a tangent to the mold core 42. Accordingly, a greater or less depth of cut, and accordingly a greater or less effective working surface diameter, may be made by varying the depth of cut made by the tool "T" in the core 42. In practice, the manufacture of such cores is greatly simplified, since no axial movement of the tool "T" is necessary during cutting, with only the radial position thereof requiring change and only a straight line movement thereof, such as the movement illustrated in FIG. 8, being necessary to form an element 30 having a flat surface. When the upper corner 58 of the cutting tool "T" just contacts the line 46 on the mold core 42, the edge 24 of the primary lip 23 and the nose portion 38 of the element 30 will theoretically be coincident. However, in practice, the nose 38 is generally spaced somewhat apart from the line 46, for two reasons. First, the actual lip 24 is sometimes formed by cutting, that is, after the lip 23 is molded, the final contours of the seal are trimmed with cutters, changing the position of the edge 24. Second, the edge 24 spreads to a certain finite width, even immediately upon installation, to form a seal band 28. Thus, it is preferred to have the deepest cut have the forward edge thereof spaced somewhat apart from the line 46 separating the surface 48 from the outer surface of the barrel cone 48. This also provides a low resistance path for the oil adjacent the seal band, thereby reducing the quantity of oil flowing entirely around the elements 30 axially outwardly thereof.

In connection with the foregoing description, it will also be appreciated that, inasmuch as the size of the shaft to be sealed will not change in use, the working surface portions of the pumping elements 30 are molded so that, in a relaxed or unstressed condition, the working surfaces of even the elements spaced radially farthest from the shaft or other part to be sealed would be of equal or smaller effective diameter than the shaft. As installed, however, in the case of a radially inwardly acting seal, the elastomeric seal body is stretched somewhat to attain an enlarged diameter, and the radially innermost working surfaces initially contact the shaft. As wear occurs, the other working surfaces gradually come into contact with the shaft since wear in the area of the primary seal band permits the elastomeric body as a whole to attain a reduced diameter so that the remaining elements can become effective.

Referring now to one novel feature of seals made according to the invention, namely, the type of contact pattern made on an associated shaft, FIGS. 9 and 10 illustrate the contrast between the seal contact pattern of typical prior art seals and the contact pattern made by the pumping elements of the invention on an associated shaft. For this purpose, it will be understood that, although the above description of a preferred form of the invention was directed to an embodiment wherein a plurality of the pumping elements ere spaced at different radial distances to accommodate eventual wear and to insure continued satisfactory pumping performance even after considerable wear of some of the elements had taken place, FIG. 10 illustrates that the form and extent of the contact pattern are novel, quite aside from the radial spacing aspects thereof. Thus, referring particularly to FIG. 9, it is there shown that a typical prior art seal includes a seal band 28a having a contact pattern of a finite width formed on an associated shaft 26a. The primary lip portion 23a of the seal body 14a includes a plurality of triangular pumping elements 60 shown in elevation at the right hand portion of FIG. 9 and in phantom lines in the remainder of FIG. 9.

These triangular elements 60 are of equal height throughout their extent, measured perpendicular to surface 22a of the body 14a. Accordingly, only a nose portion 62 of the element 60 contacts the shaft adjacent the seal band 28, with remainder performing no pumping function. Thus, the phantom lines illustrate that the major part of the pumping elements 60 will never come in contact with the shaft and that the axial extent of element contact in relation to the extent of the seal band is very slight. In typical practice, this extent might be only a matter of a few thousandths of an inch.

Furthermore, it will be noted that two other characteristics are implicitly present in the prior art. The first is that the angle of attack or angle of inclination between one edge 64 of the element 60 and the seal band 28a is relatively steep and is fixed. By reference to the right hand portion of FIG. 9, it will also be appreciated that since the lowermost or nose portions 62 only engage the shaft 26a, the portions of the elements 60 lying farther axially spaced apart from the seal band 28a are urged against the shaft with less pressure than the more closely spaced portions. Accordingly, it may be said that the pressure within the contact area made by the nose portion 62 tends to diminish as the axial distance from the primary seal band 28a is increased.

In contact to this prior art construction (FIG. 9), FIG. 10 shows a construction wherein, in addition to the conventional seal band 28b, a plurality of pumping elements 30b of greatly increased axial extent are provided. These elements 30b, shown in phantom lines in FIG. 10 produce, on the associated shaft 26b, a truncated elliptical contact pattern identified by the numeral 66. It will thus be seen that each contact pattern or area 66 includes a leading edge 68 and a trailing edge 70 disposed just inwardly, respectively, of the leading and trailing edge portions 34, 36 of the entire wedge-like pumping element 30b. Each area of contact 66 is therefore somewhat smaller, although of generally congruent shape with respect to the actual pumping element 30b. Typically, therefore, the contact area 66 has a rear margin or edge portion 72 coincident with the rear edge 32 of the pumping element 30b but has an innermost edge or margin 74 which is somewhat rounded and which may be slightly spaced apart from the seal band 28b.

By reference to FIG. 11, which is exaggerated for purposes of illustration, it will be seen that the effective leading edges 68 of each element 30b are spaced circumferentially apart from the leading edge of 34b of the entire element 30b itself, and that the trailing edges 70 of the contact area 66 are similarly spaced from the trailing edges 36b of the element 30b. These designations are in respect to a direction of rotation shown by the arrow in FIG. 11.

Referring now to FIGS. 11 and 12, the operation of he novel oil seal is illustrated. As shown in FIG. 11, the area between the leading edge 34b of the element 30b and the leading edge 68 of the actual contact area 66 is a region 76 of gradually radially diminishing dimension. Accordingly, referring to FIG. 12, it is shown that the effective contact pattern 66 is of the truncated elliptical shape indicated and that a gradual build-up of pressure will take place thereunder when the shaft 26b rotates. Accordingly, a diffused, higher pressure region 78 is generally formed in the area shown by the small x's along and just behind the leading edge 68, causing oil to flow as shown in the arrows just parallel to the high pressure area and beneath the seal band 28.

In the region 80 lying just between the nose 74 of the contact area 66 and the seal band 28 a slightly reduced pressure area is present to permit a certain amount of oil to flow parallel to the seal band but not necessarily thereunder. Accordingly, the contact pattern of the seals of the present invention provides a diffused, gradual pressure build-up area which serves to lift the seal somewhat off the shaft or at least reduce the pressure acting radially thereon, permitting oil to flow beneath the seal band 28. In this way, only the minimum of oil, if any, passes axially outwardly of the element 30b in the area illustrated by the broken line arrows. In practice, tests have shown that in the trailing edge area 70, some cavitation may even take place, attesting to the presence of a relatively hydrodynamic effect. Furthermore, tests also indicate that the pressure beneath the area 66 is at least equal to and perhaps greater along the outer margin 72 of the contact area 66, hich is, as explained above, accounted for by the inclination of the plane of the pumping element 30b with respect to the axis of the seal, this feature also serving to provide the elliptical or rounded pattern of the contact area 66.

Thus, it is believed that at least some of the improvement of the present invention is accounted for by a different mode of operation than prior known devices, namely, the reliance on a relatively large area contact portion which acts to trap a significant volume of oil and which uses a large contact area to effect gradual pressure build-up for raising the seal to permit hydrodynamic pumping and at the same time permitting a tight seal band area 28 under static conditions. It may also be appreciated that, by reason of the provision of the lowest pressure or non-contact area 80, the effectiveness of the seal band 28a is not in any way diminished, under static conditions, by the presence of the pumping element 30b.

Referring now to FIGS. 13 and 14, a modified form of the seal and method of the invention are shown. FIG. 13 shows a seal mold core 80 similar to the mold core 42 illustrated in FIGS. 7 and 8. This core 80 may be identical to the other core 42 except that the surfaces 55 of the notches "N" in the core 42 are replaced with one or more surfaces 84 which lie along an arcuate or curvilinear path 86 formed on a radius R-2 extending outwardly from a center C-2. In this embodiment, a cutting tool T-2, which may be identical to the tool "T" shown in FIGS. 7 and 8 is moved along the arc 86 rather than along a straight line path as shown in FIG. 8. The arc 86 intersects the surface 88 of the core 82 to form surfaces 84, it being understood that the core 82 is formed of radius R-1 extending outwardly from center C-1. The exact location of center C-2 is not critical. Elements formed with such a core are thus identical to elements 30 except that the surfaces thereof facing the shaft are slightly curved rather than flat.

Referring now to FIG. 14, a seal body 14c made with core 82 has at least one pumping element generally designated 30c arranged to contact a shaft 26c. The contact area begins at a leading edge 68c and ends at a trailing edge 70c, whereas the leading edge 34c of the entire element 30c is located in a circumferentially spaced apart relation from the leading edge 68c. Likewise, the trailing edge 36c of the entire element 30c is spaced apart from the trailing edge 70c of the actual working surface or contact area designated 66c. Elements thus formed are also advantageously used in the practice of the invention.

Referring now to the invention in general, and bearing in mind that seals of the invention may be embodied in radially outwardly as well as radially inwardly acting designs, and considering that the plane of the surface of each element is inclined with respect to the center line of an associated shaft and the axis of the seal itself, the contact pattern, in the most general sense, is brought about by inclining the plane of the pumping element such that the portions thereof which are most remote from the seal band are closer to the surface of the associated shaft than are the surface portions lying closer to the seal band. Accordingly, as shown in FIGS. 3-5, the margins of the seal elements 30 lying adjacent the walls 32 are of reduced diameter in respect to the portions lying near the seal band 28. In the case of a radially outwardly acting seal, however, the opposite is the case and the seal band would be of a given diameter with the axially remote margins of the pumping elements being of a larger diameter and the axially inner parts thereof being of reduced diameter. By the expression "plane of the element" or the like as used herein, and in the claims, is intended to be meant a true plane in the case of seals having a planar flat surface, as well as the slightly curved surface of the elements of the type made with a core such as that shown in FIG. 13. In such case, any generally axially directed portion of such surface will be inclined with respect to the axis of the seal, although such portion may not actually be coplanar in the strict sense.

Seals made according to the present invention have proved to provide a long life and a consistent pumping action throughout an extended seal life. Accordingly, it may be seen that the present invention provides novel oil seals and materials for making the same having a number of advantages and characteristics including those pointed out and others which are inherent in the invention. Since it is anticipated that modifications or changes to the embodiments described in detail will occur to those skilled in the art, it is anticipated that such changes may be made without departing from the spirit of the invention or the scope of the appended claims.

We claim:

1. A radially acting hydrodynamic oil seal assembly for use with an axially extending, relatively movable sealed member, said seal assembly including a seal body partially defined by first and second, generally frusto-conical seal body surfaces meeting each other along an annular area to form a primary seal band, and at least one pumping element formed on said first frusto-conical surface and extending radially and axially therefrom, the radially extending portion of said element consisting of a single surface having its leading edge portion, nose portion and trailing edge portions respectively formed by a single, generally curvilinear line, the nose portion of said line lying toward said seal band area and being spaced axially from said seal band area, the plane of said single surface being slightly inclined from the axis of said movable sealed member such that the portions of said single surface lying toward said nose portion are spaced farther radially from said movable sealed member than are the portions of said single surface lying farther from said nose portion, whereby said single surface forms an inclined circumferential chord across spaced apart portions of said seal body surface, and whereby, in the use of said seal, said sealed movable member will engage working surface portions of said single surface, said working surface forming on said movable member a contact pattern which includes a generally curvilinear margin with the nose thereof also lying in the direction of said seal band and being also spaced axially apart therefrom.

2. An oil seal assembly as defined in claim 1 wherein a plurality of said pumping elements are provided.

3. An oil seal assembly as defined in claim 1 wherein said single surface is a flat surface.

4. An oil seal assembly as defined in claim 1 wherein said single surface is a surface of revolution of a straight line, the radius of curvature thereof being substantially greater than the radius of curvature of said annular area.

5. An oil seal assembly as defined in claim 1 wherein said pumping element is further defined by a rear surface portion extending substantially perpendicular to the axis of said sealed member.

6. An oil seal assembly as defined in claim 1 wherein a plurality of said pumping elements are provided and wherein said single surfaces on certain of said pumping elements are spaced radially from the center of said sealed member a different distance from the counterpart single surfaces on the other of said plurality of pumping elements.

* * * * *